(12) United States Patent
Glazer et al.

(10) Patent No.: US 10,299,117 B2
(45) Date of Patent: May 21, 2019

(54) METHOD FOR AUTHENTICATING A MOBILE DEVICE AND ESTABLISHING A DIRECT MIRRORING CONNECTION BETWEEN THE AUTHENTICATED MOBILE DEVICE AND A TARGET SCREEN DEVICE

(71) Applicant: SCREENOVATE TECHNOLOGIES LTD., Ra'anana (IL)

(72) Inventors: Joshua Glazer, Ra'anana (IL); Sagiv Philipp, Ra'anana (IL)

(73) Assignee: SCREENOVATE TECHNOLOGIES LTD., Ra'anana (IL)

( * ) Notice: Subject to any disclaimer, the term of this patent is extended or adjusted under 35 U.S.C. 154(b) by 125 days.

(21) Appl. No.: 15/053,031

(22) Filed: Feb. 25, 2016

(65) Prior Publication Data

US 2016/0249216 A1    Aug. 25, 2016

Related U.S. Application Data

(60) Provisional application No. 62/120,539, filed on Feb. 25, 2015.

(51) Int. Cl.

| | |
|---|---|
| *H04L 29/06* | (2006.01) |
| *H04W 12/06* | (2009.01) |
| *G06K 9/52* | (2006.01) |
| *G06K 9/62* | (2006.01) |
| *G06F 3/14* | (2006.01) |

(52) U.S. Cl.
CPC .......... *H04W 12/06* (2013.01); *G06F 3/1454* (2013.01); *G06K 9/52* (2013.01); *G06K 9/6202* (2013.01); *G09G 2358/00* (2013.01)

(58) Field of Classification Search
CPC ....... H04W 12/06; G06K 9/6202; G06K 9/52; G06F 3/1454; G09G 2358/00
See application file for complete search history.

(56) References Cited

U.S. PATENT DOCUMENTS

2006/0187228 A1* 8/2006 Jung ...................... G06F 3/1454
345/537
2011/0299741 A1* 12/2011 Zhang ................ G06K 9/00228
382/117

(Continued)

*Primary Examiner* — Malcolm Cribbs
*Assistant Examiner* — Cheng-Feng Huang
(74) *Attorney, Agent, or Firm* — Browdy and Neimark, P.L.L.C.

(57) ABSTRACT

A method for authenticating direct mirroring connection between a target screen device currently presenting images or video and a mobile device is provided. The method includes capturing currently displayed image by the mobile device, detecting image feature detection by image processing of the captured image, sending capture image features to a dongle device connected to the target screen device, identifying similar features by comparing the captured image features to the features of currently displayed image of the representation or the video frame, analyzing geometrical transformation between similar image features for verifying the correspondences between the set of putative points of the captured image and the real copy of the presented image and computing the homography between the images by the verified putative point correspondences and incase the computed homography is above a predefined threshold authenticate the user as currently located in the vicinity of the target screen.

14 Claims, 3 Drawing Sheets

(56) References Cited

U.S. PATENT DOCUMENTS

2015/0110372 A1\* 4/2015 Solanki ................ G06T 7/0014
382/130
2015/0186806 A1\* 7/2015 Hiltz-Laforge ............................
G06F 17/30572
705/7.11
2016/0034245 A1\* 2/2016 Karunakaran ........ G06F 3/1454
345/2.2

\* cited by examiner

| | |
|---|---|
| 200 | Image homography authentication module |
| 210 | Receiving image features by dongle device from the mobile device |
| 220 | Detecting current displayed image or video frame |
| 230 | Detecting image feature, patterns and/or feature description by image processing the image displayed image |
| 240 | comparing image features patterns and/or feature description detected by the dongle to the image features from mobile device for and determining a set of putative point correspondences |
| 250 | analyzing geometrical transformation between similar image features for verifying the correspondences between the set of putative point of the captured image and the real copy of the presented image |
| 260 | optionally employ an iterative method to compute the homography, by computing a set of inliers consistent with the original estimate and a set of outliers (the mismatches) |
| 270 | Optionally analyzing feature geometrical transformation, including identifying correlation between geometrical properties of similar features that appear in the images of different devices to verify that the different features reflect a logical transformation of the displayed image |
| 280 | Incase of match, authenticate that, the user, which is using the mobile device is currently located in vicinity of the target screen on which the presentation is currently displayed |
| 290 | Send instruction to the mirroring module to for mirroring the presentation or the video to the authenticated device |

Fig. 3

METHOD FOR AUTHENTICATING A MOBILE DEVICE AND ESTABLISHING A DIRECT MIRRORING CONNECTION BETWEEN THE AUTHENTICATED MOBILE DEVICE AND A TARGET SCREEN DEVICE

TECHNICAL FIELD

The present invention generally relates to the field of authenticating streaming between a target screen and a mobile device.

BACKGROUND

Certain group scenarios require users to engage directly, using their own mobile or laptop devices, with display presentation on the target screen at the front of the room that is visible to all users. Here, a way for users (for example, educators, workers, or video game players), to connect their devices so that they can access, share, and interact with the ongoing presentation on the target screen. The users' identity can be verified by their proximity to the target screen. The present invention provides a method for authenticating direct mirroring connection between a target screen device presentation and mobile devices.

BRIEF SUMMARY

The present invention provides a method for authenticating direct mirroring connection between a target screen device currently presenting images or video and a mobile device. The method comprising the steps of: capturing currently displayed image or video frames by the mobile device, detecting image feature detection by image processing of the captured image, sending capture image features to a dongle device connected to the target screen device, identifying similar features by comparing the captured image features to the features of currently displayed image of the representation or the video frame, analyzing geometrical transformation between similar image features for verifying the correspondences between the set of putative point of the captured image and the real copy of the presented image and computing the homography between the images by the verified putative point correspondences and incase the computed homography is above predefined threshold authenticate user as currently located in vicinity to the target screen, connect authenticated user to screen device presentation and mirroring the current presentation to the authenticated mobile device.

According to some embodiments of the preset invention the image is captured from the screen device or from another mobile device which was previously authenticated and which displays mirrored image presentation or video.

According to some embodiments of the preset invention the receiver module is implemented as a dongle device which is connected to the target screen.

According to some embodiments of the preset invention the method further comprising the steps of sending instruction to the mirroring module to for mirroring the presentation or the video to the authenticated device connect authenticated user to screen device presentation and mirroring the current presentation to the authenticated mobile device.

According to some embodiments of the preset invention the analysis of the feature geometrical transformation include verifying the correspondences between the set of putative point and the computation of homography is based on number or percentage of verified putative points and taking the presentation image and the target image and calculating a correspondence score between a number of putative points in both images, and thereby determining whether the images may match, based on some predetermined threshold.

According to some embodiments of the preset invention the computation of homography is performed by iterative algorithm.

According to some embodiments of the preset invention the iterative algorithm perform computing a set of inliers consistent with estimation of the true correspondences of the set of inliers and set of outliers which indicate of mismatches with the true correspondences of the set of inliers.

According to some embodiments of the preset invention the analysis of the feature geometrical transformation, include identifying correlation between geometrical properties of the similar features to verify the different features which reflect logical transformation of the displayed image, wherein the correlation identification comprise the steps of: omparing sets of more than two putative points and their relative distances to determine correlation between geometrical properties or features in the presentation and target image, wherein incase the relative distances between a set of 3 or more points match, assign a higher correspondence score to the image.

According to some embodiments of the preset invention the score authentication correspondence is increased by establishing a threshold for the percentage of geometrical transformations matching for the image to be authenticated.

The present invention provides a system for authenticating direct mirroring connection between a target screen device associated with a receiver module currently presenting images or video and a plurality of mobile devices wherein the mobile devices are in proximity to the target screen. The system is comprised of:

i. connection module implemented at the mobile device for capturing currently displayed image or video frames by the mobile device, detecting image feature detection by image processing of the captured image and sending capture image features to a receiver module associated to the target screen device; and ii. image homogrophy authentication module implemented at the receiver module for identifying similar features by comparing the captured image features to the features of currently displayed image of the representation or the video frame, analyzing geometrical transformation between similar image features of the captured image and the real copy of the presented image and computing the homography between the images based geometrical transformation analysis;

wherein incase the computed homography is above predefined threshold authenticate user as currently located in vicinity to the target screen iii. a mirroring module implemented at the receiver module for mirroring currently presenting images or video to at least one authenticated device.

According to some embodiments of the preset invention the image is captured from the screen device or from another mobile device which was previously authenticated and which displays mirrored image presentation or video.

According to some embodiments of the preset invention the receiver module is implemented as a dongle device which is connected to the target screen.

According to some embodiments of the preset invention the Image homogrophy authentication module further sends instruction to the mirroring module for mirroring the presentation or the video to the authenticated device wherein upon receiving the instruction the connection module connect the authenticated user mobile device to screen target device and wherein the mirroring module start mirroring the current presentation to the authenticated mobile device.

According to some embodiments of the preset invention the computation of homography is performed by iterative algorithm.

According to some embodiments of the preset invention the iterative algorithm perform computing a set of inliers consistent with estimation of the true correspondences of the set of inliers and set of outliers which indicate of mismatches with the true correspondences of the set of inliers.

According to some embodiments of the preset invention the analysis of the feature geometrical transformation, includes identifying correlation between geometrical properties of the similar features to verify the different features which reflect logical transformation of the displayed image, wherein the correlation identification comprise the steps of:
Comparing sets of more than two putative points and their relative distances to determine correlation between geometrical properties or features in the presentation and target image, wherein incase the relative distances between a set of 3 or more points match, assign a higher correspondence score to the image.

According to some embodiments of the preset invention the score authentication correspondence is increased by 1 stablishing a threshold for the percentage of geometrical transformations matching for the image to be authenticated.

BRIEF DESCRIPTION OF THE DRAWINGS

The present invention will be more readily understood from the detailed description of embodiments thereof made in conjunction with the accompanying drawings of which:

FIG. 3 is a flowchart illustrating Image homography authentication module processing at the dongle device, according to some embodiments of the invention.

DETAILED DESCRIPTION

Figure 1:
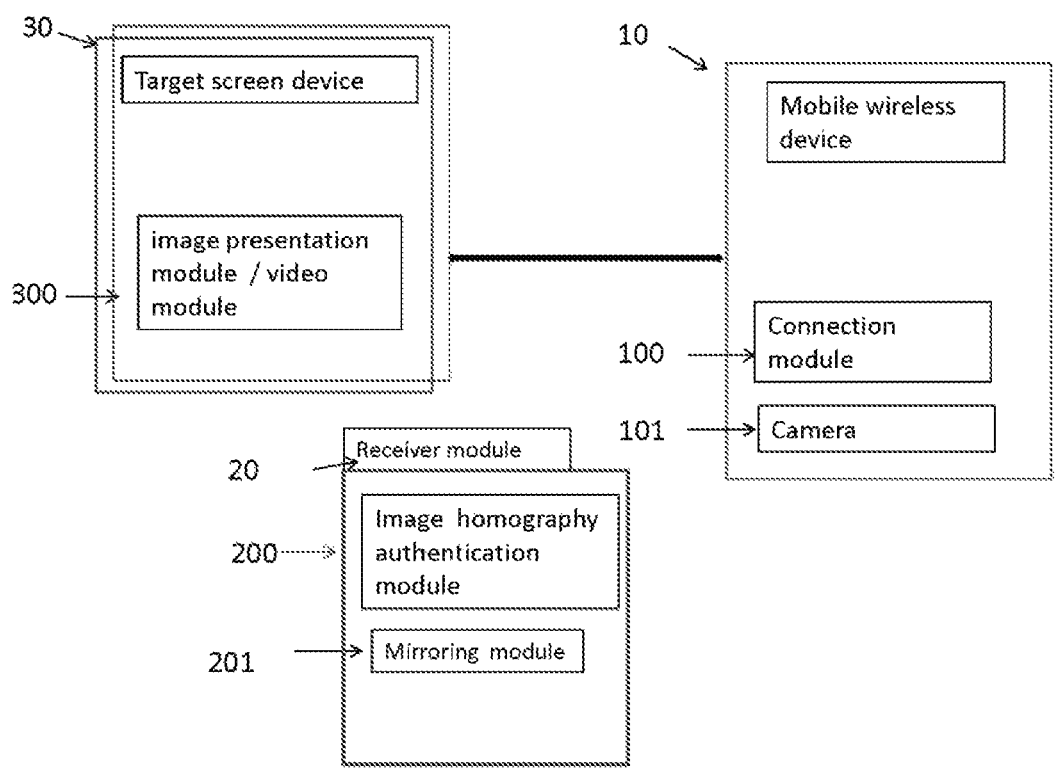
FIG. 1 is a block diagram illustrating the components of invention system including a mobile wireless device that is connecting a target screen devices, according to some embodiments of the invention.

Before explaining at least one embodiment of the invention in details, it is to be understood that the invention is not limited in its application to the details of construction and the arrangement of the components set forth in the following description or illustrated in the drawings. The invention is applicable to other embodiments and/or may be practiced or carried out in various ways. Also, it is to be understood that the phraseology and terminology employed herein is for the purpose of description and should not be regarded as limiting.

For a better understanding of the invention, the usages of the following terms in the present disclosure are defined in a non-limiting manner:

The term "Mobile device" as used herein in this application, is defined as a mobile wireless device with capability of wireless communication and capability to stream multimedia data to a screen that is external to the mobile wireless device (e.g. a mobile phone or a tablet device).

The term "Receiving (target) screen device" as used herein in this application, is defined as any external display device that can be used to show multimedia data that is streamed from a mobile wireless device via a wireless link (e.g. TV screen, computer screen, screen of a tablet device, car computer etc.).

The term "image" as used herein in this application, is defined as an optical machine-readable representation of data of presentation or video frame.

The term "image feature" as used herein in this application, is defined as any specific structures in the image such as corners, points, edges or objects, curves or boundaries between different image regions, or to properties of such a region.

The term "image pattern" as used herein in this application, is defined as any specific region in the image such as an N×M pixels of the image starting from the upper left corner.

Feature detection: In computer vision and image processing the concept of feature detection refers to methods that aim at computing abstractions of image information and making local decisions at every image point whether there is an image feature of a given type at that point or not. The resulting features will be subsets of the image domain, often in the form of isolated points, continuous curves or connected regions.

Feature extraction/description: In pattern recognition and in image processing, feature extraction is usually a form of dimensionality reduction. When the input data to an algorithm is too large to be processed and it is suspected to be notoriously redundant (much data, but not much information) then the input data will be transformed into a reduced representation set of features (also named features vector). Transforming the input data into the set of features is called feature extraction. If the features extracted are carefully chosen it is expected that the features set will extract the relevant information from the input data in order to perform the desired task using this reduced representation instead of the full size input.

"Feature representation: A specific image feature, defined in terms of a specific structure in the image data, can often be represented in different ways. For example, an edge can be represented as a boolean variable in each image point that describes whether an edge is present at that point. Alternatively, we can instead use a representation which provides a certainty measure instead of a boolean statement of the edge's existence and combine this with information about the orientation of the edge. Similarly, the color of a specific region can either be represented in terms of the average color (three scalars) or a color histogram (three functions)."

The term "receiver module" as used herein in this application, is defined as a processing communication module embedded in a dongle device or integrated in external screen such as TV or monitor device which support managing activating and streaming multimedia application.

In a conference room, is provided at least one target screen associated or integrated with a dongle which enable mirroring of the displayed content of the screen to mobiles device of user's, located within the conference room. The present invention provides a method for verifying that the mobile device is located in vicinity of the target device. The verification is achieved by capturing, an image currently displayed on the target screen the mobile device and comparing extracted features of the captured image to the displayed image.

Random sample consensus (RAN SAC) is an iterative method to estimate parameters of a mathematical model from a set of observed data which contains outliers. It is a non-deterministic algorithm in the sense that it produces a reasonable result only with a certain probability, with this probability increasing as more iterations are allowed.

FIG. 1 is a block diagram illustrating the components of invention system, including a mobile wireless device that is connecting a target screen devices, according to some embodiments of the invention. A mobile device 10 comprises at least a connection module 100 for verifying and establishing wireless connection with target screen 30 and a camera 110 for capturing the image displayed on the target screen. The target screen 30 comprises at least one presentation module or video module 130 and is associated with a receiver module which includes mirroring module 200 and Image homogrophy authentication module 200 for authenticating users. The receiver module 20 may be integrated with the target screen 30 or implemented as separate device such dongle device.

Figure 2:
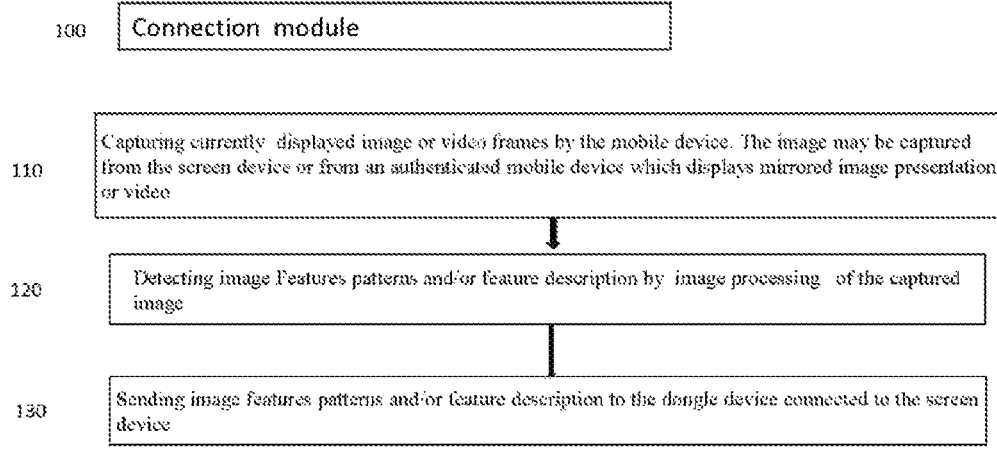
FIG. 2 is a flowchart illustrating connection module processing of the mobile device, according to some embodiments of the invention.

FIG. 2 is a flowchart illustrating connection module processing of the mobile device, according to some embodiments of the invention. The connection module include at least one of the following steps:

capturing currently displayed image or video frames by the mobile device. The image may be captured from the screen device or from an authenticated mobile device which displays mirrored image of the currently displayed image presentation or video frame (110), extracting image Features, patterns and/or feature description by image processing of the captured image (step 120) and Sending image features to the dongle device which is associated with the screen device (step 130).

The image features extraction may include algorithms such as: Scale-invariant feature transform (SIFT), Speeded Up Robust Features (SURF) or Harris & Stephens/Plessey/Shi-Tomasi corner detection algorithm.

FIG. 3 is a flowchart illustrating Image homography authentication module processing at the dongle device, according to some embodiments of the invention. The Image homography authentication module includes: at least one of the following steps:

Receiving image features and pattern by the dongle device from the mobile device (step 210), detecting current displayed image or video frame (step 220), extracting image features patterns and/or feature description by processing the displayed image (step 230), comparing image features patterns and/or feature description detected by the dongle to the image features from mobile device for and determining a set of putative point correspondences, (step 240), analyzing geometrical transformation between similar image features for verifying the correspondences between the set of putative point of the captured image and the real copy of the presented image, the verified putative point correspondences are used for computing the homography between the images (step 250), Optionally employ an iterative method to compute the homography, by computing a set of inliers consistent with the original estimate and a set of outliers (the mismatches) (step 245) and analyzing feature geometrical transformation, including identifying correlation between geometrical properties of similar features that appear in the images of different devices to verify that the different features reflect a logical transformation of the displayed image (step 260)

Optionally analyzing feature geometrical transformation, including identifying correlation between geometrical properties of similar features that appear in the images of different devices to verify that the different features reflect a logical transformation of the displayed image (step 270)

in case the computed homography is above predefined threshold, authenticate that the user, which is using the mobile device is currently located in vicinity of the target screen on which the presentation is currently displayed (step 280);

send instruction to the mirroring module to for mirroring the presentation or the video to the authenticated device (step 290). The verification process may require minimum number of similar features for authentication. The analysis of the feature geometrical transformation, may include identifying correlation between geometrical properties of the similar feature to verify the different features reflect logical transformation of the displayed image.

The computation of homography may be achieved by iterative algorithm such as RANSAC. The RANSAC enable to estimate the homography based on optimization process by computing a set of inliers consistent with this estimate (the true correspondences), and outliers (the mismatches). The computation of the homography is intendant for close estimation with high certainty which indicates that both frames contain the same content.

en.wikipedia.org/wiki/RANSAC.

The RANSAC algorithm is a learning technique to estimate parameters of a model by random sampling of observed data. Given a dataset whose data elements contain both inliers and outliers, RANSAC uses the voting scheme to find the optimal fitting result. Data elements in the dataset are used to vote for one or multiple models. The implementation of this voting scheme is based on two assumptions: that the noisy features will not vote consistently for any single model (few outliers) and there are enough features to agree on a good model (few missing data). The RANSAC algorithm is essentially composed of two steps that are iteratively repeated:

1. In the first step, a sample subset containing minimal data items is randomly selected from the input dataset. A fitting model and the corresponding model parameters are computed using only the elements of this sample subset. The cardinality of the sample subset is the smallest sufficient to determine the model parameters.

2. In the second step, the algorithm checks which elements of the entire dataset are consistent with the model instantiated by the estimated model parameters obtained from the first step. A data element will be considered as an outlier if it does not fit the fitting model instantiated by the set of estimated model parameters within some error threshold that defines the maximum deviation attributable to the effect of noise.

The set of inliers obtained for the fitting model is called consensus set. The RANSAC algorithm will iteratively repeat the above two steps until the obtained consensus set in certain iteration has enough inliers.

The input to the RANSAC algorithm is a set of observed data values, a way of fitting some kind of model to the observations, and some confidence parameters. RANSAC achieves its goal by repeating the following steps:

1. Select a random subset of the original data. Call this subset the hypothetical 2. A model is fitted to the set of hypothetical inliers.

3. All other data are then tested against the fitted model. Those points that fit the estimated model well, according to some model-specific loss function, are considered as part of the consensus set.

4. The estimated model is reasonably good if sufficiently many points have been classified as part of the consensus set.

5. Afterwards, the model may be improved by reestimating it using all members of the consensus set.

This procedure is repeated a fixed number of times, each time producing either a model which is rejected because too few points are part of the consensus set, or a refined model together with a corresponding consensus set size. In the latter case, we keep the refined model if its consensus set is larger than the previously saved model.)

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples. It is to be understood that the details set forth herein do not construe a limitation to an application of the invention.

Furthermore, it is to be understood that the invention can be carried out or practiced in various ways and that the invention can be implemented in embodiments other than the ones outlined in the description above. It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element. It is to be understood that where the claims or specification refer to "a" or "an" element, such reference is not to be construed that there is only one of that element.

It is to be understood that where the specification states that a component, feature, structure, or characteristic "may", "might", "can" or "could" be included, that particular component, feature, structure, or characteristic is not required to be included. Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks. The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only. Meanings of technical and scientific terms used herein are to be commonly understood as by one of ordinary skill in the art to which the invention belongs, unless otherwise defined. The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalent.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node.

What is claimed is:

1. A method for authenticating a direct mirroring connection between a target screen device associated with a receiver module currently presenting images or video and a plurality of mobile devices wherein at least one mobile device is in proximity to the target screen device, said method comprising the steps of:

manually capturing any original displayed image or video frames which are currently appearing on the target screen device at a time of an authentication process by a camera of the at least one mobile device, creating a captured image copy, wherein the target screen is located at a stationary specific location;

detecting image features by image processing of the captured image copy;

sending detected features from the at least one mobile device to a receiver module associated to the target screen device;

identifying similar features by comparing the captured image copy features to features of at least one image or the video frames appearing on the target screen device during the authentication process;

analyzing a geometrical transformation between similar image features of the captured image copy and the original displayed image or video frames of the image appearing on the target screen during the authentication process;

computing an homography between the captured image copy and the original displayed image or video frames based on a geometrical transformation analysis; and when the computed homography is above a predefined threshold, authenticating the at least one mobile device as currently located in a vicinity of the stationary specific location of the target screen device, wherein upon authentication, performing the steps of:

sending an instruction to a mirroring module for mirroring the original displayed image or the video frames to the at least one mobile device and connecting the at least one mobile device to the target screen device;

mirroring the original displayed image or the video frames to the at least one mobile device via a wireless link network;

wherein the geometrical transformation analysis includes identifying a correlation between geometrical properties of similar features in the captured image copy and the original displayed image or video frames to verify different features which reflect a logical transformation of the original displayed image or video frames, wherein the correlation identification comprise the steps of:
- comparing sets of more than two putative points and relative distances between the sets of more than two putative points to determine correlation between geometrical properties or features in the original displayed image and the captured image copy, and
- when the relative distances between a set of three or more putative points match, assigning a higher correspondence score to the captured image copy.

2. The method of claim 1, wherein the original displayed image or video frames are captured from the target screen device or from another mobile device which was previously authenticated and which displays a mirrored image presentation or video.

3. The method of claim 1, wherein the receiver module is implemented as a dongle device which is connected to the target screen device.

4. The method of claim 1, wherein the geometrical transformation analysis includes verifying correspondences between a set of putative points and the computing of the homography is based on a number or percentage of verified putative points correspondences,
- calculating a correspondence score between a number of putative points in both the original displayed image or video frames and the captured target image copy to determine whether the original displayed image or video frames and the captured target image copy match, based on a predetermined threshold.

5. The method of claim 1, wherein the computation of the homography is performed by an iterative algorithm.

6. The method of claim 5, wherein the iterative algorithm computes a set of inliers consistent with an estimation of true correspondences of the set of inliers and a set of outliers that indicates mismatches with the true correspondences of the set of inliers.

7. The method of claim 1, wherein the correspondence score is increased by establishing a threshold for a percentage of geometrical transformations matching the captured image copy to be authenticated.

8. A system for authenticating a direct mirroring connection between a target screen device associated with a receiver module currently presenting images or video frames and a plurality of mobile devices, wherein the plurality of mobile devices are in proximity to the target screen device, said system comprising:
- one mobile device of the plurality of mobile devices, having a camera on the one mobile device, and having a processor and memory for executing instructions to cause a connection module implemented on the one mobile device to manually capture any original displayed image or video frames by the one mobile device which is currently appearing on the target screen device at a time of the authentication process, detecting image features by image processing of the captured image copy and sending the captured image copy features from the one mobile device to a receiver module associated with the target screen device; and
- a target screen device located at a stationary specific location having a receiver module comprised of:
- an image homography authentication module, the target screen device having a processor and memory for executing instructions to cause the homography authentication module to:
  - identify similar features by comparing the captured image copy features to features of the original displayed image or video frames on the target screen device, and
  - analyze a geometrical transformation between the similar image features of the captured image and the original image copy of the current image appearing on the target screen device,
  - compute an homography between the captured image copy and the original displayed image or video frames based a geometrical transformation analysis, and when the computed homography is above a predefined threshold, authenticating the one mobile device as currently located in a vicinity of the stationary specific location of the target screen device; and
- a mirroring module, the target screen device having a processor and memory for executing instructions to cause the mirroring module to mirror original displayed image or video frames to the one mobile device via a wireless link network;
- wherein the geometrical transformation analysis includes identifying a correlation between geometrical properties of similar features in the captured image copy and the original displayed image or video frames to verify different features which reflect a logical transformation of the original displayed image or video frames, wherein the correlation identification comprise the steps of:
- comparing sets of more than two putative points and relative distances between the sets of more than two putative points to determine correlation between geometrical properties or features in the original displayed image and the captured image copy, and
- when the relative distances between a set of three or more putative points match, assigning a higher correspondence score to the captured image copy.

9. The system of claim 8, wherein the original displayed image or video frames are captured from the target screen device or from another mobile device which was previously authenticated and which displays a mirrored image presentation or video.

10. The system of claim 8, wherein the receiver module is implemented as a dongle device which is connected to the target screen device.

11. The system of claim 8, wherein the image homography authentication module further comprises software code to send instructions to the mirroring module for mirroring the presentation or the video to the one mobile device,
- wherein upon receiving the instructions, the connection module connects the one mobile device to the screen target device, and
- wherein the mirroring module starts mirroring a current presentation to the one mobile device.

12. The system of claim 8, wherein the image homography authentication module further comprises software code to compute the homography by performing an iterative algorithm.

13. The system of claim 12, wherein the image homography authentication module further comprises software code to run the iterative algorithm to compute a set of inliers consistent with an estimation of true correspondences of the set of inliers and a set of outliers that indicates mismatches with the true correspondences of the set of inliers.

14. The system of claim 8, wherein the correspondence score is increased by establishing a threshold for a percentage of geometrical transformations matching the captured image copy to be authenticated.

* * * * *